(12) United States Patent
Komaki et al.

(10) Patent No.: US 6,844,045 B2
(45) Date of Patent: Jan. 18, 2005

(54) METHOD FOR MAKING OPTICAL INFORMATION MEDIUM AND OPTICAL INFORMATION MEDIUM

(75) Inventors: Tsuyoshi Komaki, Tokyo (JP); Hideki Hirata, Tokyo (JP); Tomoki Ushida, Tokyo (JP); Mamoru Usami, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/645,536

(22) Filed: Aug. 22, 2003

(65) Prior Publication Data
US 2004/0096618 A1 May 20, 2004

Related U.S. Application Data

(63) Continuation of application No. PCT/JP02/01643, filed on Feb. 25, 2002.

(30) Foreign Application Priority Data

Feb. 23, 2001 (JP) ........................................ 2001-049449

(51) Int. Cl.$^7$ ................................................ B32B 3/02
(52) U.S. Cl. ................ 428/64.1; 428/64.4; 430/270.11
(58) Field of Search .............................. 428/64.1, 64.4, 428/913; 430/270.11, 495.1, 945

(56) References Cited

U.S. PATENT DOCUMENTS

| | | | |
|---|---|---|---|
| 5,312,663 A | * | 5/1994 | Kosinski et al. ............ 428/65.1 |
| 5,770,348 A | * | 6/1998 | Kondo ......................... 430/321 |
| 2001/0018093 A1 | * | 8/2001 | Decre .......................... 427/58 |

FOREIGN PATENT DOCUMENTS

| | | |
|---|---|---|
| JP | 59-206081 | 11/1984 |
| JP | 04-017139 | 1/1992 |
| JP | 04-283434 | 10/1992 |
| JP | 07-230632 | 8/1995 |
| JP | 07282468 | * 10/1995 |
| JP | 08-036790 | 2/1996 |
| JP | 11-073691 | 3/1999 |
| JP | 11-086355 | 3/1999 |
| JP | 11-086356 | 3/1999 |
| JP | 11-203724 | 7/1999 |

OTHER PUBLICATIONS

Japanese Journal of Applied Physics vol. 39(2000) pp. 775–778, Author: Michel M. J. Decre and Piet H. G. M. Vromans, Title: "Cover Layer Technology for the High–Numerical–Aperture Digital Video Recording System".

Technical Digest ISOM 2001 (2001) ppl 316–317, Author: Tsuyoshi Komaki, et al. Title: "Spin–coating technology of the cover layer for the DVR–Blue disc".

* cited by examiner

Primary Examiner—Elizabeth Mulvaney
(74) Attorney, Agent, or Firm—Oblon, Spivak, McClelland, Maier & Neustadt, P.C.

(57) ABSTRACT

A method is provided for preparing an optical information medium comprising a disk-shaped supporting substrate having a center hole, an annular information recording area thereon, and an annular resin-based light-transmitting layer on the information recording area through which recording/reading laser beam is transmitted. In the formation of the light-transmitting layer, a coating fluid containing an actinic radiation-curable resin is fed onto the supporting substrate having the information-recording area formed thereon and the supporting substrate is rotated for spreading the coating fluid over the supporting substrate to thereby form a resin layer, and subsequently, the resin layer is irradiated with actinic radiation to thereby cure said resin layer while reducing the rotation speed of the supporting substrate. This method is capable of suppressing the size of the bump formed in the outer peripheral region of the light-transmitting layer.

12 Claims, 7 Drawing Sheets

METHOD FOR MAKING OPTICAL INFORMATION MEDIUM AND OPTICAL INFORMATION MEDIUM

CROSS-REFERENCE TO RELATED APPLICATION

This application claims priority to International Application No. PCT/JP02/01643 filed Feb. 25, 2002 and Japanese Application No. 2001-049449 filed Feb. 23, 2001, and the entire content of both applications is hereby incorporated by reference.

TECHNICAL FIELD

This invention relates to a method for making an optical information medium such as a read-only optical disk or an optical recording disk, and this invention also relates to an optical information medium.

BACKGROUND ART

To record and store a vast quantity of information as typified by moving image information, advanced optical information media such as read-only optical disks and optical recording disks are required to increase their recording density for increasing the capacity. To meet such a demand, engineers have been engaged in the research and development works targeting a higher recording density.

One such approach relating to digital versatile disks (DVD) is to shorten the wavelength of a recording/reading laser beam and increase the numerical aperture (NA) of a recording/reading optical system objective lens, thereby reducing the spot diameter of the recording/reading laser beam. As compared with CD, DVD is successful in achieving a recording capacity of 6 to 8 folds (typically 4.7 GB/side) by changing the recording/reading wavelength from 780 nm to 650 nm and the NA from 0.45 to 0.6.

Increasing the NA, however, leads to a reduced tilt margin. The tilt margin is a permissible tilt of an optical recording medium relative to an optical system, which depends on the NA. The tilt margin is in proportion to $$\lambda/(d \cdot NA^3)$$

wherein $\lambda$ denotes the wavelength of recording/reading beam and "d" denotes the thickness of a transparent substrate the recording/reading beam enters. If the optical recording medium is inclined or tilted relative to the laser beam, a wavefront aberration (or coma) occurs. The coefficient of wavefront aberration is represented by $$(\tfrac{1}{2}) \cdot d \cdot \{n^2 \cdot \sin\theta \cdot \cos\theta\} \cdot NA^3/(n^2 - \sin^2\theta)^{-5/2}$$

wherein n denotes the refractive index of the substrate and $\theta$ is a tilt angle. It is appreciated from these formulae that the tilt margin may be increased and the occurrence of comatic aberration be suppressed by reducing the thickness "d" of the substrate. In fact, the DVD design is such that a tilt margin is secured by reducing the thickness of the substrate to about one half (about 0.6 mm) of the thickness (about 1.2 mm) of the CD substrate.

To record moving images of better quality for a longer period of time, there has been proposed a structure allowing for use of a thinner substrate. In this structure, a substrate of an ordinary thickness is used as a supporting substrate for maintaining rigidity, pits or a recording layer is formed on the surface of the supporting substrate, and a light-transmitting layer of about 0.1 mm thick is formed thereon as a thin substrate. Recording/reading beam reaches the pits or the recording layer through the light-transmitting layer. This structure can achieve a higher recording density due to a greater NA because the substrate can be made extremely thin as compared with the prior art. Media having such structure are disclosed in Japanese Patent Laid-Open No. (JP-A) 10-320859 and JP-A 11-120613.

The provision of a light-transmitting layer of approximately 0.1 mm thick allows for use of an objective lens having a large numerical aperzture NA, say about 0.85.

A typical technique used in forming the light-transmitting layer having a thickness of about 0.1 mm is spin coating technique. When the spin coating technique is employed, the disk substrate is secured on the rotating table and the resin is supplied onto the surface of the disk substrate, and the disk substrate is rotated to thereby spread the resin by centrifugal force and form the resin layer. In such process, it is commonplace to use an actinic radiation-curable resin such as UV curable resin which does not require heating for the curing and which cures at a high speed.

However, when the resin is spread by centrifugal force, the resin is likely to be accumulated in the outer peripheral region of the disk substrate, and a bump is likely to be formed in the resin layer. Furthermore, the resin layer is generally cured after terminating the rotation by irradiating an actinic radiation such as UV, and accordingly, the resin after the termination of the rotation is likely to move back to become raised near the outer peripheral edge of the disk substrate by the surface tension. As a consequence, a relatively wide bump is formed near the outer peripheral edge of the disk substrate. The area where such bump has been formed can not be used as a recording area, and this is a serious disadvantage for the recording capacity of the medium particularly in view of the large area per unit length in radial direction of the outer peripheral region of the disk substrate. Accordingly, there is a need to reduce the width of the bump or to avoid the bump formation around the outer peripheral region of the disk substrate.

JP-A 11-73691 discloses a process wherein a photocuring resin is coated on the substrate to form a resin layer, the bump formed in the outermost peripheral region of the substrate is covered with a mask, and the resin layer is cured except for the area covered with the mask by irradiating the resin layer with curing beam. The uncured region is then flattened by selectively removing the raised part of the uncured resin, and the resin layer is again irradiated with the curing beam to thereby form a cured resin layer which is flat over the entire surface. This process, however, is so complicated requiring two curing steps, attachment/detachment of the mask, and the resin removal, and this complexity renders the process far from being practicable in an industrial scale.

JP-A 11-86355 proposes removal of the bump formed at the outer peripheral edge of the light-transmitting layer by trimming with a diamond wheel. JP-A 11-86356 proposes removal of the bump formed at the outer peripheral edge of the light-transmitting layer by cutting or press shearing. These methods, however, are not only cumbersome but also suffer from generation of burrs and attachment of dusts, which may adversely affect the properties of the optical disk.

JP-A 11-203724 proposes formation of the light-transmitting layer by applying a UV curable resin on a rotating substrate, and irradiating the coating with UV after reducing the rotational speed of the substrate to thereby reduce the size of the bump in the outer peripheral region. JP-A 11-203724 also proposes a method wherein a UV curable resin is dropped onto a stationary substrate, a glass plate is placed on the resin, the substrate is rotated to spread the resin, and the UV is irradiated while rotating the substrate to thereby reduce the size of the bump of the light-transmitting layer. JP-A 11-203724 also proposes a method wherein the substrate is preliminarily cut so that the cross-section of the outer peripheral region of the substrate is in the shape of wedge to thereby reduce the size of the bump in the outer peripheral region of the light-transmitting layer. JP-A 11-203724 also proposes a method wherein, before the coating of the UV curable resin, the outer peripheral region of the substrate is selectively irradiated with a short-wavelength UV to improve wettability of the irradiated area, and then coating the resin to thereby reduce the size of the bump in the outer peripheral region of the light-transmitting layer. JP-A 11-203724 also proposes a method wherein a UV curable resin is spread by rotating the substrate, excessive resin accumulated at the outermost peripheral region is spun off by rotating the substrate at a higher speed, and then, the resin is cured by UV irradiation to thereby reduce the size of the bump in the outer peripheral region of the light-transmitting layer. JP-A 11-203724 also proposes a method wherein a UV curable resin is spread by rotating the substrate, the inner peripheral region of the substrate is selectively irradiated with UV to cure the resin in that region, excessive resin accumulated at the outermost peripheral region is spun off by rotating the substrate at a higher speed, and then, the resin is cured by UV irradiation to thereby reduce the size of the bump in the outer peripheral region of the light-transmitting layer. JP-A 11-203724 also proposes a method wherein the light-transmitting layer is formed after fitting the substrate in a ring-shaped member to increase the diameter of the area to be coated, and removing the ring-shaped member together with the bump of the light-transmitting layer formed thereon to thereby obtain a smooth light-transmitting layer. JP-A 11-203724 also proposes a method wherein the light-transmitting layer is formed on a substrate having a diameter which is larger than the one normally used so that the bump is formed in the outer peripheral region, and cutting off the outer peripheral region of the substrate with the bump formed thereon to thereby obtain a smooth light-transmitting layer. JP-A 11-203724 also proposes a method wherein a UV curable resin is spread, excessive resin in the outer peripheral region of the substrate is removed by rubbing off with a cloth, by sucking with a vacuum pump, or by blowing off with nitrogen, and then, the resin is cured by UV irradiation to thereby reduce the size of the bump in the outer peripheral region of the light-transmitting layer.

Most of the methods disclosed in JP-A 11-203724, however, may suffer from a drop-off in productivity due to increase in the number of steps, increase in the complexity of controlling the production system, and the like.

DISCLOSURE OF THE INVENTION

Decrease of the area allowed for the information recording area is not the only problem caused by the formation of the bump or thickened portion in the resin layer in the outer peripheral region of the disk substrate. The disk also suffers from the problem as described below.

The bump has a larger thickness, and this part experiences a larger degree of contraction upon curing. The outer peripheral region of the disk, therefore, suffers from an increased deflection as well as increased axial runout.

The medium, therefore, experiences deflection upon curing of the light-transmitting layer, and the degree of deflection is higher in the outer periphery of the disk. In addition, thickness of the resin layer gradually increases from the interior to the exterior of the disk when conventional spin coating process is employed. As described above, increase in the thickness of the resin layer is associated with the decrease in the tilt margin, and the disk suffers from the problem that the outer peripheral region with the increased tilt has the reduced tilt margin.

Such disk is also associated with the risk of the optical pickup colliding against the bump as the optical pickup approaches the outer periphery of the medium.

An object of the present invention is to provide a method for preparing an optical information medium comprising a supporting substrate, an information recording area thereon, and a light-transmitting layer on the information recording area through which recording/reading laser beam is transmitted, wherein thickening of the outer peripheral region is suppressed by a simple method.

Such objects are attained by the present invention according to (1) to (8) as described below.

(1) A method for preparing an optical information medium comprising a disk-shaped supporting substrate having a center hole, an annular information recording area thereon, and an annular resin-based light-transmitting layer on the information recording area through which recording/reading laser beam is transmitted, wherein the light-transmitting layer is formed by feeding a coating fluid containing an actinic radiation-curable resin onto the supporting substrate having the information-recording area formed thereon and rotating the supporting substrate for spreading the coating fluid over the supporting substrate to thereby form a resin layer, and subsequently, irradiating the resin layer with actinic radiation to thereby cure said resin layer while reducing the rotation speed of the supporting substrate.

(2) The method according to the above (1) wherein energy density of said actinic radiation on the surface of said resin layer is relatively low around outer peripheral region of said resin layer.

(3) The method according to the above (1) or (2) wherein said irradiation of actinic radiation is carried out such that outer boundary of the area irradiated with said actinic radiation substantially matches with the outer peripheral edge of said supporting substrate.

(4) The method according to any one of the above (1) to (3) wherein, in the formation of the resin layer, said irradiation of actinic radiation is carried out after scraping off at least some of the coating fluid that protrudes out of the outer peripheral edge of said supporting substrate.

(5) An optical information medium comprising a disk-shaped supporting substrate having a center hole, an annular information recording area thereon, and an annular resin-based light-transmitting layer on the information recording area through which recording/reading laser beam is transmitted, wherein a recess is formed on the surface of the light-transmitting layer from outside the outer peripheral edge of the information recording area to the outer peripheral edge of the light-transmitting layer, and a minute bump is formed outside the recess.

(6) The optical information medium according to the above (5) wherein the relation:

$$D_1 \geq D_2$$

is satisfied when the distance in thickness direction from the surface of the light-transmitting layer at the position just inside the recess to the bottom of the recess is designated $D_1$, and the distance in thickness direction from the bottom of the recess to the top of said minute bump is designated $D_2$.

(7) An optical information medium comprising a disk-shaped supporting substrate having a center hole, an annular information recording area thereon, and an annular resin-based light-transmitting layer on the information recording area through which recording/reading laser beam is transmitted, wherein the light-transmitting layer is a layer containing an actinic radiation-curable resin formed by spin coating, and thickness of the light-transmitting layer does not increase from the inner peripheral region to the outer peripheral region, at least on the information recording area.

(8) The optical information medium according to the above (7) wherein thickness of the light-transmitting layer is less in the outer peripheral region compared to the inner peripheral region, at least on the information recording area.

In the present invention, a coating fluid containing an actinic radiation-curable resin is supplied onto the rotating supporting substrate to spread the coating fluid over the supporting substrate and to thereby form a resin layer, and then, the resin layer is irradiated with actinic radiation while reducing the rotation speed of the supporting substrate. The present invention is similar to the conventional spin coating technique in that the coating fluid is spread to form the resin layer, and different from the conventional spin coating technique in that the resin layer is cured while the rotation speed of the supporting substrate is reduced. This difference contributes to the elimination of the raised area in the outer peripheral region of the resin layer which is higher than the resin layer surface in the inner area, and as a consequence, excessive increase in the deflection and axial runout in the outer peripheral region of the medium is avoided.

In the spin coating technique, the resin supplied to the center or near the center of the supporting substrate is spread out by the centrifugal force generated by the rotation of the supporting substrate. Accordingly, the supporting substrate is rotated at a relatively high speed during the spreading of the resin. However, if the resin layer is irradiated with actinic radiation with the rotational speed of the supporting substrate kept at the same level as the one used in the spreading of the resin, the size of the bump in the outer peripheral region might be suppressed but the resin layer after curing suffers from inconsistency since the resin that has already started curing is forced to move on the supporting substrate. This inconsistency results in an increased jitter and other inferior electric properties. Also, the situation in this case is such that the actinic radiation is irradiated while the resin is spun off the disk, and the spun off resin cures in the form of icicles extending in radially outward direction from the outer peripheral edge of the supporting substrate. The medium then suffers from poor appearance, and the step of removing the resin icicles is required. In contrast, the actinic radiation is irradiated in the present invention after completing the spreading of the resin while the rotation speed of the supporting substrate is reduced. In this case, the resin that had started curing will not be forced to move, and the inconsistency that may affect the recording/reading will not be formed in the resin layer on the information recording area. Also, the resin icicles extending radially outward from the outer peripheral edge of the supporting substrate will not be formed.

JP-A 11-203724, supra describes a method wherein the UV irradiation is conducted after coating a UV curable resin on the rotating substrate, and under the condition wherein the rotational speed of the substrate has been reduced to some degree. JP-A 11-203724 is similar to the present invention in that the resin is cured at a rotational speed which is lower than the rotational speed used in the spreading of the resin. The rotational speed, however, is controlled in JP-A 11-203724 in a stepwise manner in the resin spreading and in the resin curing. To be more specific, there is disclosed in JP-A 11-203724 that, when the rotational speed during the resin spreading is up to about 1000 rpm, the UV is preferably irradiated at a rotational speed at the level of about 40 to 50% of the rotational speed used in the resin spreading, and when rotational speed during the resin spreading 1000 rpm or higher, the UV is preferably irradiated at a rotational speed at the level of about 30 to 60%. In the Example of JP-A 11-203724, the bump formed in the outer peripheral region of the light-transmitting layer has a width of about 3 mm when the rotational speed used in the resin spreading is 810 rpm, and the rotational speed used in the UV irradiation is 400 rpm, and the bump formed in the outer peripheral region of the light-transmitting layer has a width of about 2 mm when the rotational speed during the resin spreading is 1200 rpm and the rotational speed during the UV irradiation is 500 rpm. When the rotational speed is regulated in stepwise manner in the resin spreading and the resin curing as in the case of JP-A 11-203724, it is impossible to totally eliminate the bump as evident from the Example of JP-A 11-203724. In addition, such step-wise control of the rotational speed invites inconsistent curing of the resin layer since the centrifugal force applied to the resin layer reduces in stepwise manner.

In contrast, the actinic radiation is irradiated in the present invention while the rotational speed of the supporting substrate is gradually reduced, namely, while the centrifugal force applied to the resin layer is continuously reduced. Accordingly, the resin layer is avoided from undergoing curing while the resin layer is in an inconsistent state.

Figure 10A:
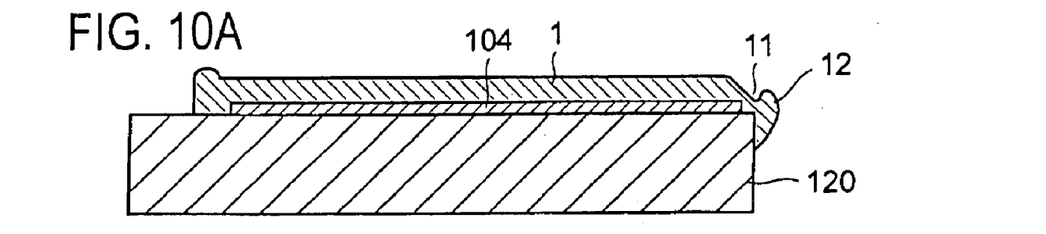
FIGS. 10A, 10B, and 10C are cross-sectional views illustrating the optical information medium of the present invention.
Figure 10B:
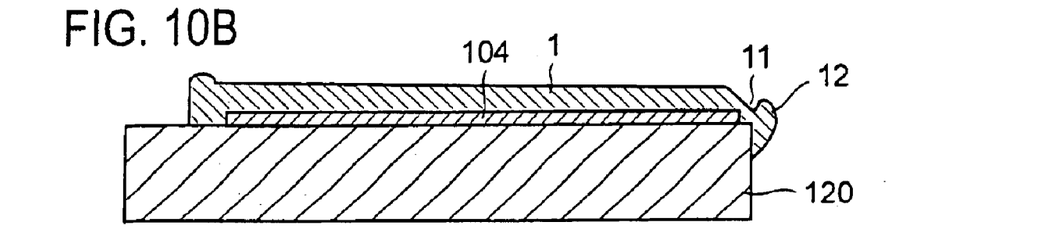
Figure 10C:
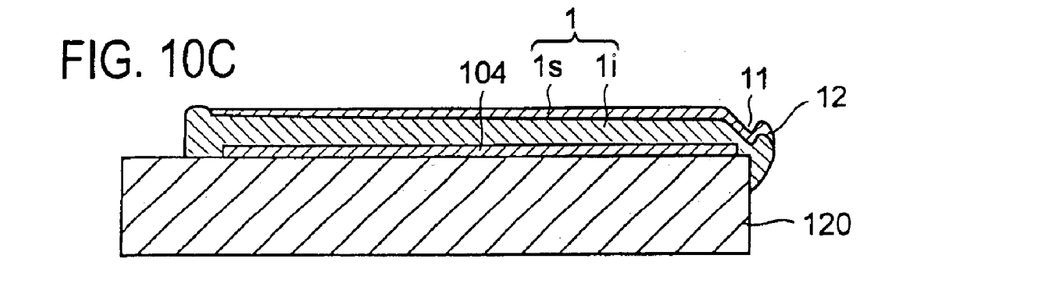

In the present invention, the light-transmitting layer 1 of consistent thickness can be formed at least on the information recording area of the information recording layer 104 as shown in FIG. 10A, or the light-transmitting layer 1 in the outer peripheral region can be formed to have a thickness less than the thickness of the inner peripheral region at least on the information recording area as shown in FIG. 10B. Accordingly, the outer peripheral region of the medium does not suffer from the reduced tilt margin. Alternatively, the light-transmitting layer 1 may be constituted as shown in FIG. 10C from a laminate of the inner layer 1$i$ comprising the resin layer formed and cured by the procedure as described above and a surface layer 1$s$ comprising a resin of higher rigidity in order to improve the scratch resistance of the light-transmitting layer. When such surface layer 1$s$ is formed by spin coating technique, the outer peripheral region of the surface layer 1$s$ will be thicker than the inner peripheral region. If the outer peripheral region of the inner layer 1$i$ is thinner than the inner peripheral region, the light-transmitting layer 1 comprising the inner layer 1$i$ and the surface layer 1$s$ can be formed to have a substantially consistent thickness at least on the information recording area. In this case, however, consideration should be paid to the situation that the wave aberration correction of the optical system irradiating the recording/reading laser beam is optimized to the light-transmitting layer of particular thickness range, and that the wave aberration may increase beyond the tolerable range when the difference between the maximum and the minimum thickness of the light-transmitting layer is excessively large on the information recording area. In view of such situation, the difference is preferably up to 8 $\mu$m.

In the preferable embodiment of the present invention, the actinic radiation is irradiated such that the outer boundary of the irradiated area substantially coincides with the outer peripheral edge of the supporting substrate. When the irradiation of the actinic radiation is conducted by using an actinic radiation-irradiating equipment normally used in the art for the rotating supporting substrate, the supporting substrate is irradiated with the actinic radiation beyond the outer peripheral edge of the supporting substrate. In the meanwhile, the excessive resin is spun off the supporting substrate by the rotation of the supporting substrate beyond the outer peripheral edge of the supporting substrate. When the actinic radiation-irradiating apparatus normally used in the art is used, the spun off resin also undergoes curing, and the spun off resin may become cured in the form of resin icicles extending outward from the outer peripheral edge of the supporting substrate. Accordingly, removal of the resin icicles is required before completing the manufacture and the number of production steps required will be increased. In contrast, curing of the resin spun off the outer peripheral edge of the supporting substrate in the form of resin icicles is avoided when the actinic radiation is selectively irradiated with the outer boundary of the irradiation area substantially matching with the outer peripheral edge of the supporting substrate.

In the present invention, the resin layer is cured after the spreading of the resin by the spin coating technique by the irradiation of the actinic radiation while the rotation speed of the supporting substrate is reduced, and as a consequence, movement on the information recording area of the resin in the curing process is avoided. The resin, however, is more likely to flow toward the outer peripheral edge in the outermost peripheral region of the supporting substrate where the centrifugal force generated by the rotation is at its maximum, namely, in the area outside the information recording area. When the actinic radiation is irradiated by using a means wherein the energy density of the actinic radiation is less in the outer peripheral region of the supporting substrate, the resin flow is further likely to take place since curing in the outer peripheral region is less promoted. As a consequence, the outermost peripheral region of the light-transmitting layer 1 may have a surface profile as shown in FIG. 11 depending on the pattern of rotational speed control of the supporting substrate in the curing process and energy distribution of the actinic radiation on the surface of the resin layer.

Figure 11:
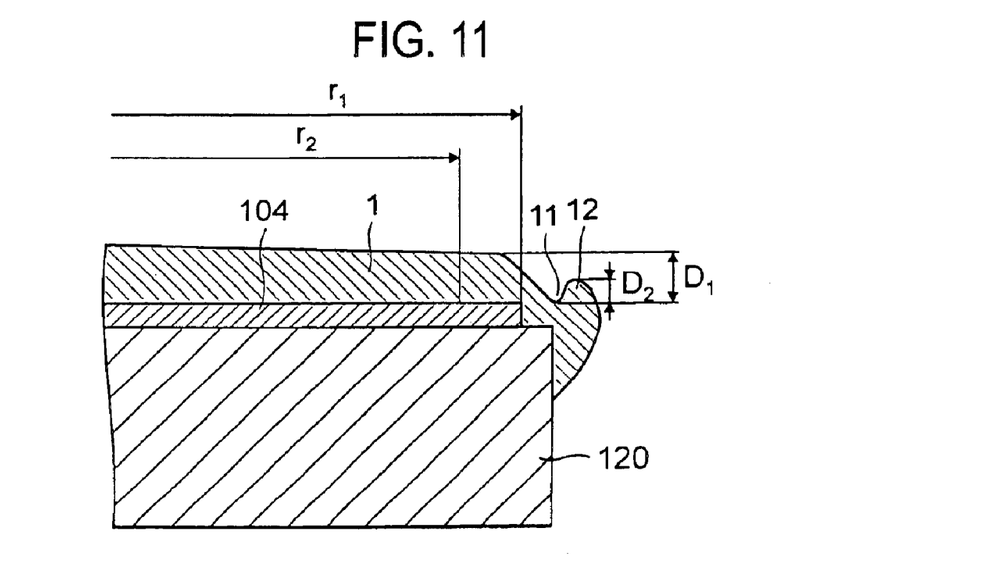
FIG. 11 is an enlarged cross-sectional view of the optical information medium of the present invention near the outer peripheral edge.
Figure 12:
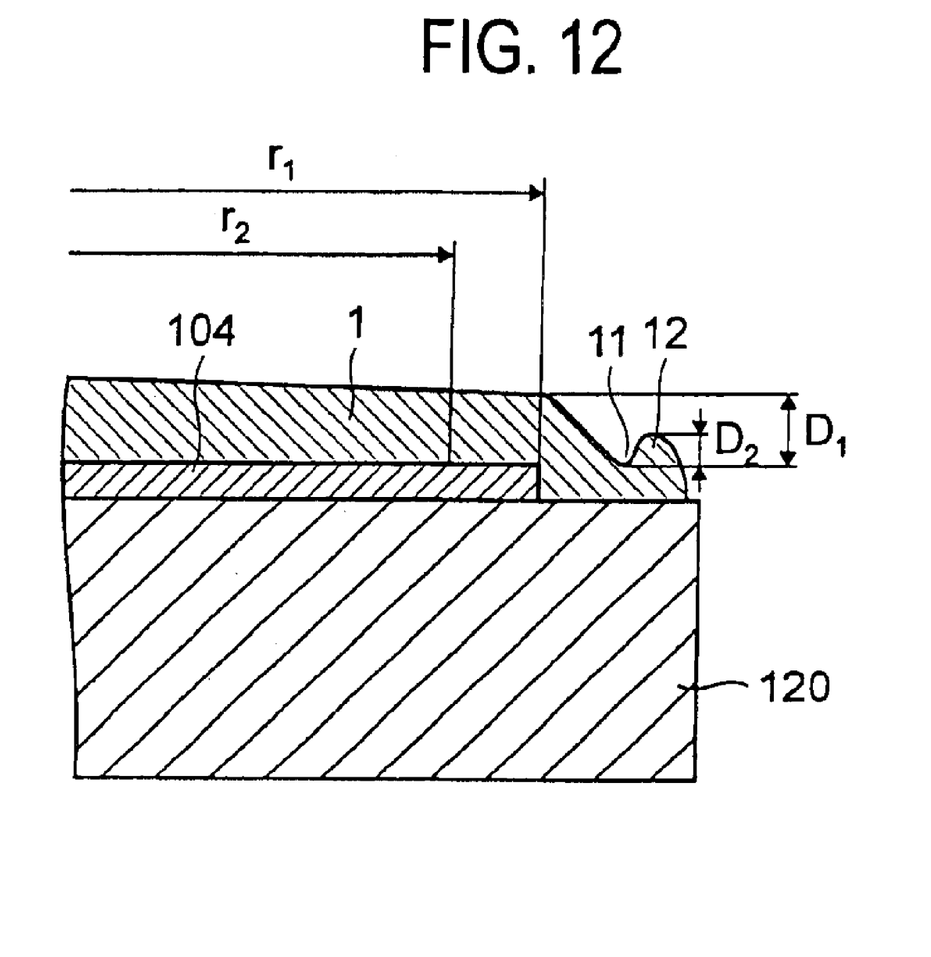
FIG. 12 is an enlarged cross-sectional view of the optical information medium of the present invention near the outer peripheral edge.

In FIG. 11, the surface of the light-transmitting layer 1 has a profile such that the surface becomes rather suddenly depressed from the position outside the outer boundary of the information recording area to the outer peripheral edge of the light-transmitting layer 1, and the recess 11 is thereby formed. The minute bump 12 is formed outside the recess 11 as shown in FIG. 11 since the resin that escaped the spinning off moves back by the surface tension of the resin to form a slightly raised area. However, it should be noted that the height of the bump formed by the resin that moved back is lower than the one formed by the conventional spin coating technique wherein the resin layer is cured after terminating the rotation since curing of the resin layer is completed before the termination of the rotation of the supporting substrate. Accordingly, the peak of the minute bump 12 can be reduced to the level equal to or lower than the surface level of the light-transmitting layer 1 inside the minute bump 12 (on the information recording area), and such minute bump 12 is avoided from colliding with the optical pickup of the medium drive. Note that, in FIG. 11, the information recording area constitutes a part of the information recording layer 104, and the outer periphery of the information recording area is located inside (on the left side in FIG. 11 of) the outer periphery of the information recording layer 104. In FIG. 11, the information recording layer 104 has radius $r_1$, and the information recording area has radius $r_2$. It should also be noted that, although the radius of the light-transmitting layer 1 is larger than the radius of the supporting substrate 120 and the light-transmitting layer 1 extends beyond the supporting substrate 120 in FIG. 11, the light-transmitting layer 1 may have a radius which is smaller than the radius of the supporting substrate 120 as shown in FIG. 12.

Formation of the recess 11 and the minute bump 12 as described above leads to the merits as described below.

When the bump is formed in the outermost peripheral region by the conventional spin coating technique, the bump formed is thick and this part undergoes a considerable contraction in the curing. As a consequence, the outer peripheral region of the medium experiences significant deflection and axial runout. In contrast, in the present invention, the surface of light-transmitting layer becomes rather abruptly depressed in the outermost peripheral region, and the bump formed in the exterior of the recess is minute. As a consequence, the medium of the present invention experiences less deflection and less axial runout in the outer peripheral region compared to the case wherein conventional bump is formed, and not only that, the medium of the present invention experiences less deflection and less axial runout compared to the case wherein the conventional bump is removed by grinding or other means.

It is to be noted that, in a system where the optical pickup is never located on the outermost peripheral region of the medium, the peak of the minute bump 12 may exceed the surface level of the light-transmitting layer 1 inside the minute bump 12 (on the information recording area). Even if the minute bump 12 were formed in such a manner by controlling various conditions in the light-transmitting layer formation, the size of the minute bump 12 will not be excessively large, and influence on the deflection and the axial runout will be limited to a certain extent.

When the light-transmitting layer 1 has a bi-layer structure comprising the inner layer 1i and the surface layer 1s as shown in FIG. 10C, the surface layer 1s is formed from an actinic radiation-curable resin having a relatively high hardness. A resin with such high hardness, however, often suffer from the problem of birefringence and other optical properties and the mechanical precision of the medium is highly influenced by such properties. In order to reduce such optical or mechanical influence, the thickness of the surface layer 1s is preferably reduced to the order of several micrometers. When such thin surface layer 1s is formed by spin coating technique, the coating is usually formed by using a solvent-soluble resin since viscosity of the coating fluid should be reduced. The solvent included in the solvent-soluble resin is more than often erosive to the supporting substrate 120 comprising a resin such as polycarbonate. The type of the solvent-soluble resins that can be used, therefore, is limited, and such limitation is undesirable in view of design flexibility.

On the other hand, when the present invention is used in the formation of the inner layer 1i by spin coating technique, the inner layer 1i is formed with the recess 11 and the minute bump 12 near its outer peripheral edge. When spin coating is conducted for forming the surface layer 1s on the inner layer 1i having such surface profile, the coated solvent-soluble resin moves outward along the surface profile of the inner layer 1i, and the resin finally jumps off the minute bump 12 in outward, upward direction. In other words, the minute bump 12 functions as a jumping hill for the solvent-soluble resin that is being spun off. As a consequence, the spun off solvent-soluble resin is avoided from becoming attached to the side surface of the supporting substrate 120, and erosion of the supporting substrate 120 is thereby prevented.

The surface profile of the inner layer 1i in the outermost peripheral region is preserved after the formation of the surface layer 1s since the surface layer 1s is thin. Accordingly, in the light-transmitting layer having a bi-layer structure, the surface profile of the light-transmitting layer is also such that the surface is depressed from the position outside the information recording area to the outer peripheral edge of the light-transmitting layer, and then raised outside the recess. The present invention may also be used in the formation of the surface layer 1s. The surface layer 1s, however, is thin. Also, the surface layer 1s is often formed by using a solvent-soluble resin which experience significant increase in viscosity after evaporation of the solvent, and due to such increased viscosity, the resin is unlikely to experience the backward inward movement by the surface tension. Therefore, there is no specific need to use the present invention in the formation of the surface layer 1s.

When the resin layer is formed on the supporting substrate in a preferred embodiment of the present invention, irradiation of the actinic radiation is conducted after scraping off at least some of the coating fluid that moved beyond the outer peripheral edge of the supporting substrate. This scraping is preferably carried out as shown, for example, in FIG. 4B. First, the coating fluid is spread over the disk substrate 100 including the supporting substrate, and when excessive coating fluid has been spun off the disk substrate 100, the scraper 200 is approached toward the outer side surface of the disk substrate 100. Rotation of the disk substrate 100 is continued while the scraper 200 is maintained at a minute distance from the side surface of the disk substrate 100. The coating fluid that moved beyond the outer peripheral edge of the disk substrate 100 is thereby equally leveled along the entire periphery of the disk substrate 100, and as a consequence, size of the recess 11 and the minute bump 12 formed along the outer peripheral edge of the disk substrate 100 becomes consistent along the entire periphery.

BEST MODE FOR CARRYING OUT THE INVENTION

Figure 9:
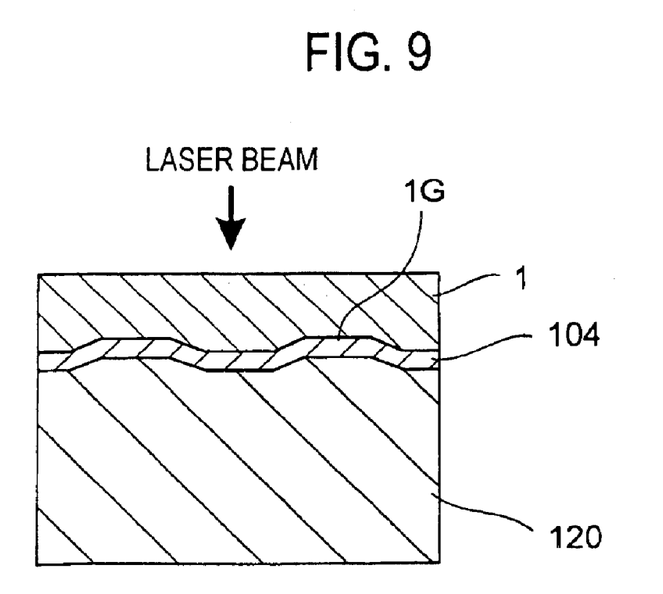
FIG. 9 is a fragmentary cross-sectional view of an optical information medium.

Referring to FIG. 9, there is schematically illustrated one exemplary construction of an optical information medium according to the invention in a fragmentary cross-sectional view. The optical information medium illustrated is a recording medium comprising a supporting substrate 120, an information recording layer 104 as a recording layer on the supporting substrate 120, and a light-transmitting layer 1 on the information recording layer 104. Recording/reading laser beam reaches the recording layer 104 through the light-transmitting layer 1. The light-transmitting layer comprises an actinic radiation-curable resin. In the present invention, the actinic radiation-curable resin used is preferably a UV curable resin, and the embodiment described below is an embodiment wherein the actinic radiation-curable resin used is a UV curable resin.

The invention is applicable to any type of information recording layer. Specifically, the invention is applicable to phase change recording media, pit formation type recording media, and magneto-optical recording media, for example. In general, additional layers such as a dielectric layer and a reflective layer are provided on at least one side of the recording layer for the purposes of protecting the recording layer and achieving optical effects, although they are omitted in FIG. 9. The invention is not limited to the recordable type as shown in the drawing, and may also be applicable to the read-only type. In the latter case, the information recording layer is constructed by a reflective layer which covers the a row of pits formed integrally in the supporting substrate 120. Not all surface of the information recording layer is used for the recording of information. In the case of a disk-shaped medium, an annular information recording layer is formed and the annular area excluding the innermost and the outermost area of the layer is used as the information recording area.

Next, the process of forming the light-transmitting layer of the present invention is described.

Figure 1:
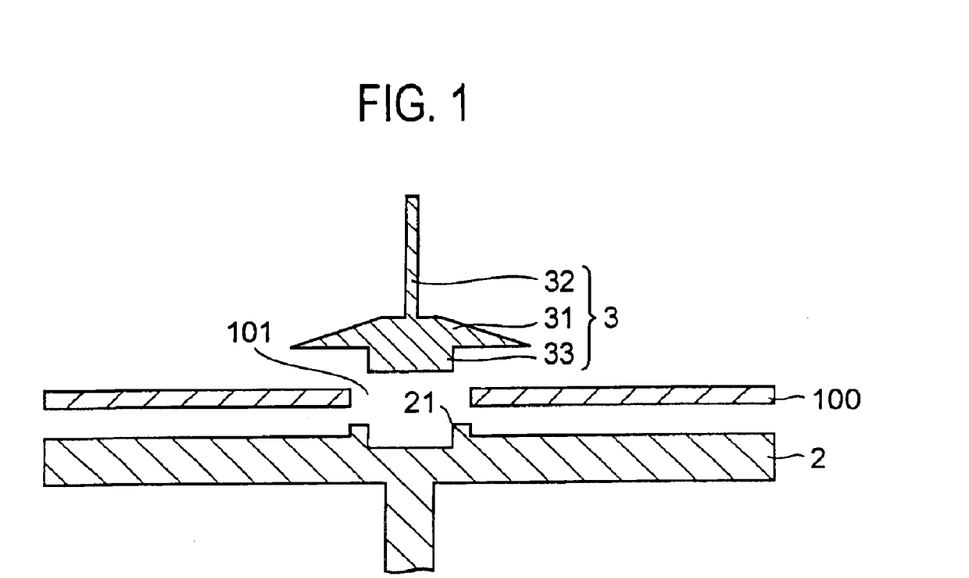
FIG. 1 is a cross-sectional view illustrating the process of forming the light-transmitting layer.
Figure 2:
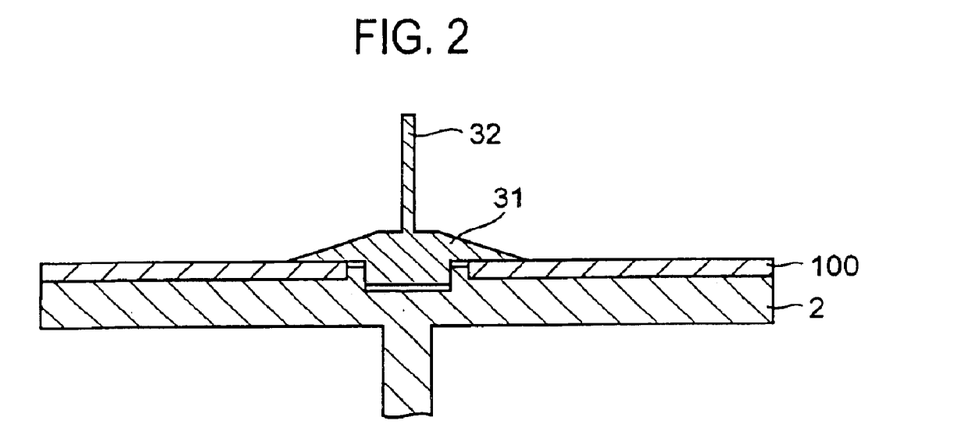
FIG. 2 is a cross-sectional view illustrating the process of forming the light-transmitting layer.

As shown in FIGS. 1 and 2, a disk substrate 100 is first rested on a rotating table 2. The disk substrate 100 is a supporting substrate having an information recording layer formed thereon and has a center hole 101. The disk substrate 100 is secured with the information recording layer on the top side by tightly fitting the center hole 101 on an annular raised rim 21 of the rotating table 2. FIGS. 1 and 2 are cross-sectional views showing only planes appearing in the cross section, with any backward portion being omitted. This rule of illustration is the same throughout the cross-sectional views.

Next, the center hole 101 is closed with a plug means 3. The plug means 3 includes a disk member 31 for closing the center hole 101, an integral support shaft 32 extending upright from the disk member 31 at the center thereof, and an integral back projection 33 extending downward from the disk member 31 on the side facing the center hole 101. By engaging the projection 33 into the annular raised rim 21 of the rotating table 2, the plug means 3 is secured to the rotating table 2 and aligned with the disk substrate 100. It is not critical how to secure the disk substrate 100 and the plug means 3 to the rotating table 2. In one alternative securing procedure, the disk substrate 100 is first engaged with the plug means 3 which is, in turn, engaged with the rotating table 2.

Figure 3A:
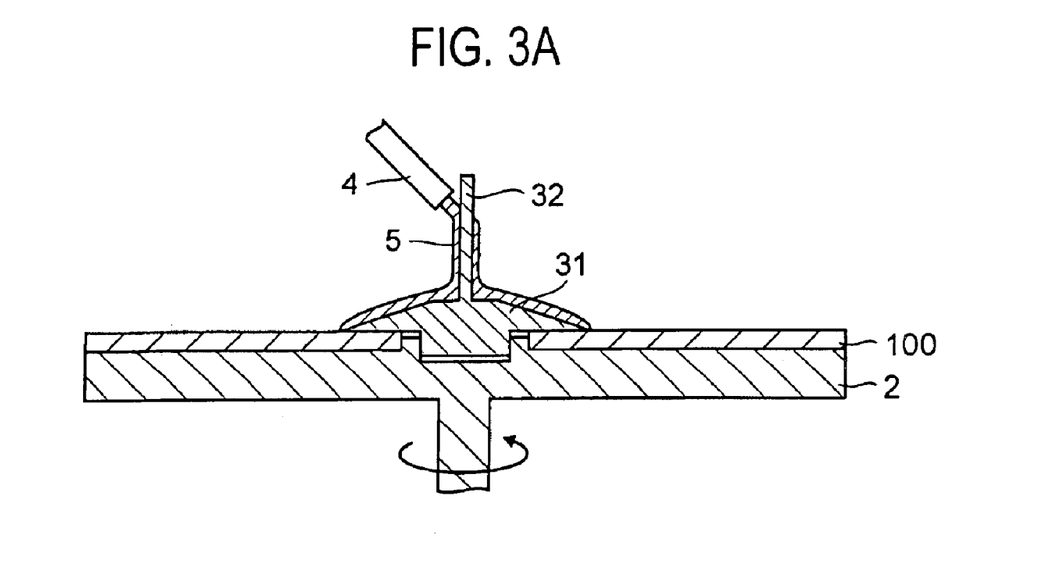
FIGS. 3A and 3B are cross-sectional views illustrating the process of forming the light-transmitting layer.

Next, a coating fluid 5 in the form of a resin or resin solution is injected from a nozzle 4 to the outer periphery of the support shaft 32 as shown in FIG. 3A. At this point, the rotating table 2 is rotated at a relatively low speed, preferably about 20 to 100 rpm, so that the coating fluid may be uniformly spread over the disk member 31.

Figure 4A:
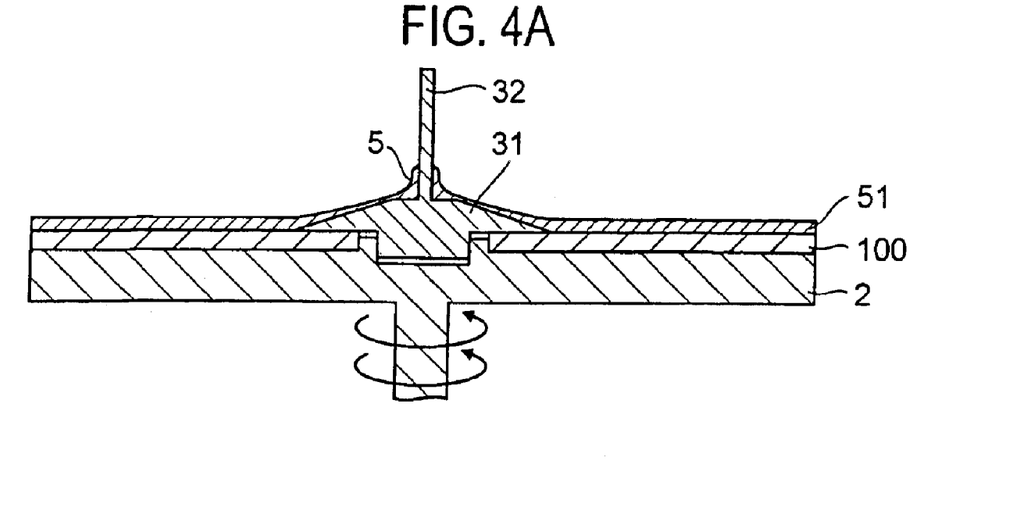
FIGS. 4A and 4B are cross-sectional views illustrating the process of forming the light-transmitting layer.

Next, as shown in FIG. 4A, the rotating table 2 is rotated at a relatively high speed to cast the coating fluid 5 over the disk substrate 100 for forming a resin layer 51 on the disk substrate 100. The spin coating conditions of the coating fluid are not critical. It is known that, in the spin coating wherein the conditions are identical except for the viscosity of the coating fluid, thickness of the coating increases theoretically in proportion to the square root of the viscosity of the coating fluid. On the other hand, thickness of the coating decreases with the increase in the rotational speed and the rotating time. Accordingly, the rotational speed (rpm) and rotating time of the spin coating are adequately determined by taking the thickness of the resin layer 51 to be formed and the viscosity of the coating fluid into consideration. When a light-transmitting layer having a thickness of about 30 to 300 $\mu$m is to be formed, it is preferable to select a viscosity of the coating fluid from the range of about 100 to 100,000 centipoise, a rotational speed from the range of about 500 to 6,000 rpm, and a rotating time from the range of about 2 to 10 seconds.

As described above, a scraper 200 as shown in FIG. 4B is preferably used in the spreading of the coating fluid 5. However, if the scraper 200 is brought near the outer side surface of the disk substrate 100 at the start of the spreading of the resin, the coating fluid that has hit the scraper 200 may bounce back to the surface of the disk substrate 100 to adversely affect the surface property of the resin layer 51. Accordingly, the scraper 200 is preferably approached toward the side surface of the disk substrate after the ceasing of the spin-off of the excessive coating fluid off the disk substrate 100.

With regard to the shape of the scraper 200, at least the part of the scraper 200 that approaches the side surface of the disk substrate 100 is preferably in the form of a thin blade like a knife edge. In the scraping of the coating fluid, the distance between the scraper 200 and the side surface of the disk substrate 100 is preferably reduced to the minimum, that is, to the extent that the rotation of the disk substrate 100 is not disturbed by the contact of the disk substrate 100 with the scraper 200, and it is also possible that the scraper 200 is substantially in contact with the disk substrate 100. The scraper 200 may comprise any material and exemplary materials include a metal, a resin, ceramics, and a composite material comprising two or more of such materials.

Figure 4B:
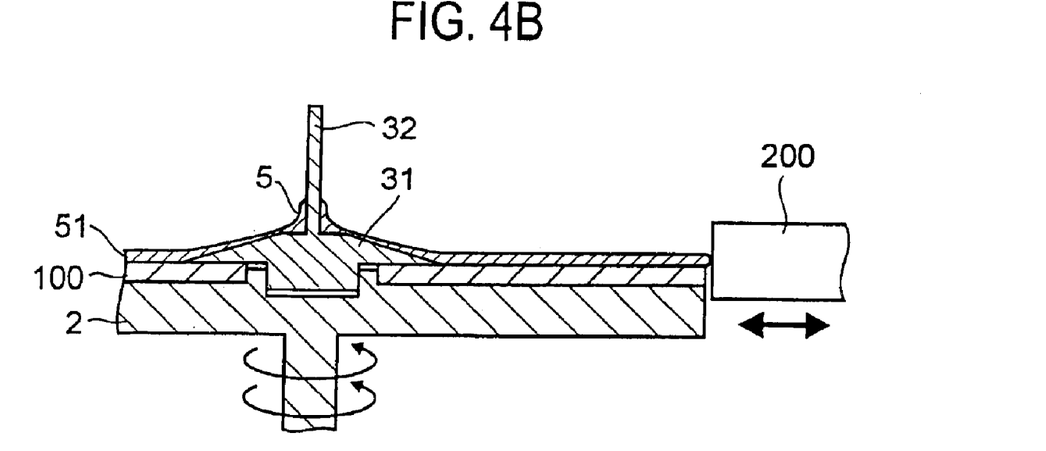
Figure 5:
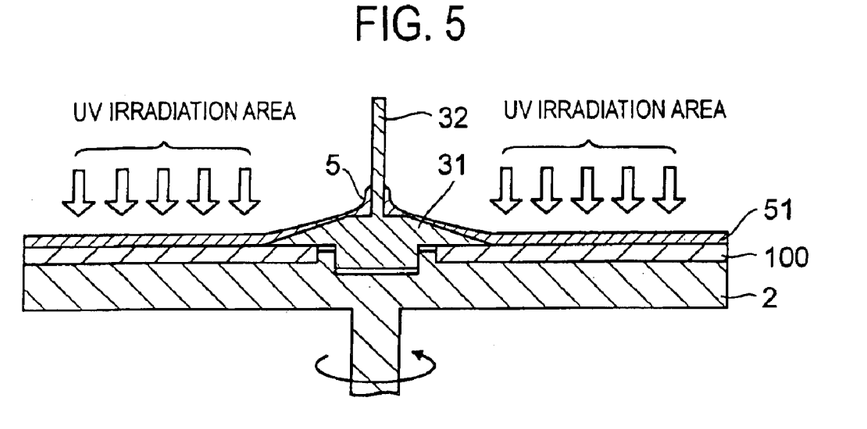
FIG. 5 is a cross-sectional view illustrating the process of forming the light-transmitting layer.

After forming the resin layer by spreading the resin at a constant rotational speed, the resin layer 51 is irradiated with UV for curing as shown in FIG. 5 while gradually reducing the rotational speed of the disk substrate 100. When the scraper 200 is used as shown in FIG. 4B, some of the coating fluid that has been scraped off remains on the scraper 200, and this coating fluid becomes cured if the fluid is irradiated with UV. Therefore, the scraper 200 is preferably separated from the side surface of the supporting substrate 100 before the UV irradiation.

The time from the start of the slowing down of the rotation of the disk substrate 100 to the termination of the rotation (deceleration time) is preferably in the range of 0.1 to 3.0 seconds, and more preferably 0.1 to 2.0 seconds. When the deceleration time is too short, resin viscosity will play a large role and the resin that should have been blown off the disk will remain in the outer peripheral region of the resin layer, and hence, the rotation is likely to be terminated with the bump being formed in the outer peripheral region. When the deceleration time is too long, the curing process is likely to be completed with the resin layer in an inconsistent state since the resin in the process of curing is moved by the centrifugal force.

The UV irradiation is preferably started at a timing between the start of the deceleration and lapse of 30% of the deceleration time, and the UV irradiation is preferably maintained until 80% of the deceleration time has elapsed. When the start of the irradiation is too late, the resin layer is likely to become raised on the side of the outer periphery. In addition, when the start of the irradiation is too late, the resin will not cure until the rotational speed has been reduced to a relatively low level, and the centrifugal force is likely to be reduced before the sufficient curing of the resin, and as a consequence, the recess 11 formed near the outer peripheral edge of the resin layer is likely to be shallow and the minute bump 12 is likely to be oversized. When the timing of the termination of the UV irradiation is too early, the resin will be either insufficiently cured or the curing of the resin will be completed with the resin layer in an inconsistent state. Although the UV irradiation can be continued until and after the termination of the rotation, such irradiation for a prolonged time will invite curing of the resin that has been spun off the surface of the disk substrate 100. Removal of such cured resin is difficult, and therefore, the irradiation is preferably stopped once the resin has cured to the extent that it does not flow.

The profile how the rotational speed of the disk substrate 100 is reduced is not particularly limited as long as the reducing rate of the rotational speed per unit time (deceleration rate) is either constant or smoothly altered from the start of the slowing down to the termination of the rotation. In other words, the deceleration rate may be either kept at a constant level, or increased/decreased in gradual manner. The deceleration rate, however, is typically designed so that it gradually increases with lapse of time.

When the outer boundary of the area irradiated with the UV is outside the outer peripheral edge of the disk substrate 100, the resin blown off the outer peripheral edge of the disk substrate 100 by centrifugal force may become cured in the form of resin icicles extending radially outward. On the other hand, when the outer boundary of the irradiated area is inside the outer peripheral edge of the disk substrate 100, and on the information recording area of the disk substrate 100, the boundary between the cured area and the uncured area will be located on the information recording area. Such boundary, which is optically inconsistent, will adversely affect the recording and reading. Accordingly, it is preferable that the outer boundary of the irradiated area substantially coincides with the outer peripheral edge of the disk substrate 100 (outer peripheral edge of the supporting substrate), and it is more preferable that the outer boundary of the irradiated area is located in the area between the line 0.3 mm radially outside of the outer peripheral edge of the information recording area and the outer peripheral edge of the disk substrate 100. It is to be noted that the outer boundary of the information recording area is generally located at 0.5 to 2 mm radially inside the outer peripheral edge of the disk substrate 100.

In FIG. 5, the plug means 3 has been placed inside the inner periphery of the disk substrate 100. Curing of the entire resin layer 51 with the plug means 3 located at this position is undesirable since, when the plug means 3 is separated from the disk substrate 100 after the curing, a burr may be formed on the inner peripheral edge of the resin layer 51 and the debris of the burr may be scattered around. It is therefore preferable that the UV is irradiated except for the area around the plug means 3 as shown in FIG. 5, and after removing the plug means 3, the entire resin layer 51 is cured in the full curing step as will be described below. This procedure prevents generation of he burrs as described above, and the light-transmitting layer will also enjoy a consistent thickness in the inner peripheral region. If desired, the plug member 3 may be removed before the initial UV irradiation. In this case, generation of the burrs can be avoided although the thickness of the light-transmitting layer in the inner peripheral region may become inconsistent.

In order to irradiate the UV such that the outer peripheral edge of the irradiated area substantially matches with the outer peripheral edge of the disk substrate 100, a mask having an aperture corresponding to the planar size of the disk substrate 100 is preferably placed between the UV source and the disk substrate 100. Alternatively, UV irradiation may be conducted by using a projection exposure equipment which is capable irradiating precise patterns. In addition to such projection exposure equipment, also preferable for use in such UV irradiation are UV irradiation equipment capable of selectively irradiating a particular area. Such equipment, for example, may be Spot UV Curing Equipment or Multilight both manufactured by Ushio Inc. In the case of the Spot UV Curing Equipment, the shape of the irradiated area can be adjusted by mounting a lens at the tip of the optical fiber unit, and selective irradiation is thereby enabled so that the surface of the disk substrate 100 excluding the areas near the outer and the inner peripheral edges can be irradiated. To be more specific, when a rectangular area is irradiated while rotating the disk substrate, the surface of the disk substrate can be irradiated in an annular manner. It is also to be noted that, when the Multilight is used, it is preferable to simultaneously use the mask as described above.

The actinic radiation irradiated is preferably the one wherein energy density on the resin layer surface is relatively low near the outer peripheral region. Curing speed is relatively low in the area where the energy density is low, and the resin will be still moving outward near the outer peripheral area even after substantial completion of the curing near the inner peripheral area of the resin layer. As a consequence, the surface of the light-transmitting layer becomes rather suddenly depressed outside the information recording area as described above, and the recess 11 is thereby formed. With regard to the ratio of the energy density in the outer peripheral area to the energy density in the inner peripheral area, a suitable value may be determined by experiments.

Of the irradiation means as mentioned above, the projection exposure equipment is an irradiation means wherein energy distribution in the irradiation plane is substantially constant, while the Spot UV Curing Equipment and the Multilight are irradiation means wherein energy density decreases in the irradiation area from the center to the outer periphery.

In the present invention, the light-transmitting layer can be formed to a substantially constant thickness from the inner peripheral region to the outer peripheral region on the information recording area, or alternatively, the light-transmitting layer can be formed such that the outer peripheral region is thinner than the inner peripheral region. The thickness profile of the light-transmitting layer from the inner peripheral region to the outer peripheral region can be altered by adequately controlling the spin coating conditions and the curing conditions of the resin layer.

Figure 3B:
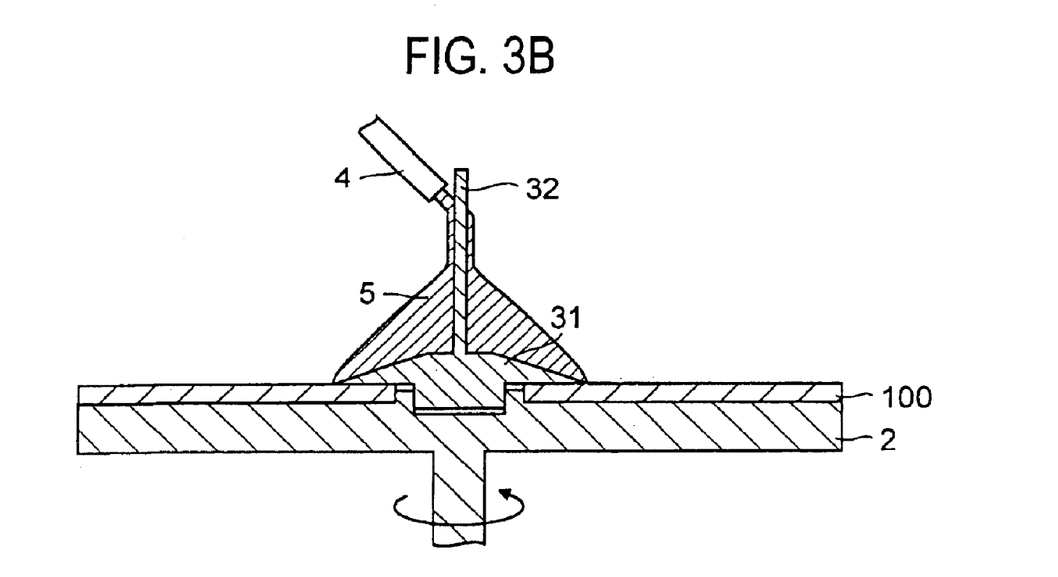

When the light-transmitting layer to be formed is the one wherein the outer peripheral region is thinner than the inner peripheral region, the coating fluid 5 is preferably supplied to the disk member 31 so that the heap of the coating fluid 5 supplied is in the form of a cone as shown in FIG. 3B. Decrease in the thickness of the resin layer in radial direction becomes steeper with the increase in the height of the cone-shaped heap of the coating fluid 5, namely, with the increase in the gradient of the slope of the cone. The height of the cone-shaped heap can be controlled by regulating the vertical position of the nozzle 4 in supplying the coating fluid 5 to the disk member 31, or by regulating the rotational speed of the disk substrate 100 (rotational speed of the disk member 31). To be more specific, the height of the cone-shaped heap increases with the decrease in the rotational speed in the feeding of the coating fluid, and with increase in the height of the position of the nozzle 4.

The thickness distribution profile of the resin layer can also be controlled by regulating the rotational speed and the time until the termination of the rotation (deceleration time) in the spreading of the resin on the supporting substrate. To be more specific, thickness reduction rate of the resin layer in radial direction will be increased when the rotational speed is increased or the deceleration time is reduced in the spreading of the resin. It is to be noted that the rotational speed in the resin spreading can be increased without changing the thickness of the resin layer by using a coating fluid of higher viscosity.

As described above, use of a relatively short UV irradiation time is preferable in the present invention in order to prevent curing of the resin scattering around the disk after being span or blown off the surface of the disk substrate 100. As a consequence, the resin layer may not be fully cured although the resin has been cured to the extent that it does not flow. In such a case, inclusion of the full curing step as described below is preferable for the full curing of the resin layer.

Figure 6:
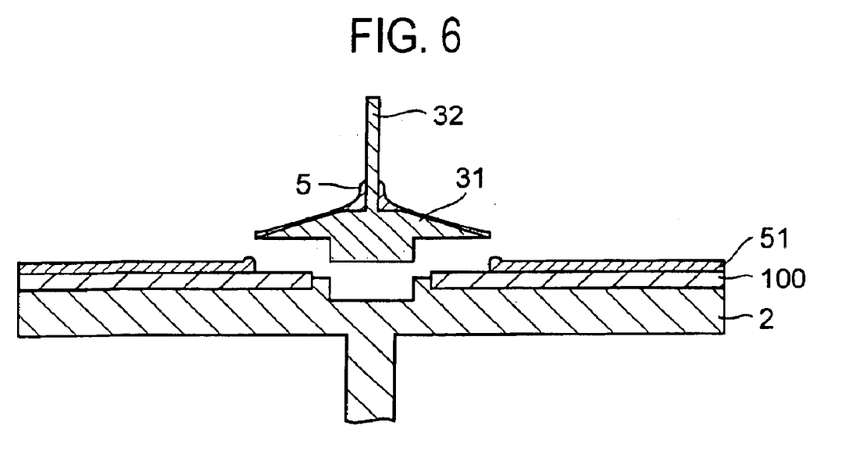
FIG. 6 is a cross-sectional view illustrating the process of forming the light-transmitting layer.
Figure 7:
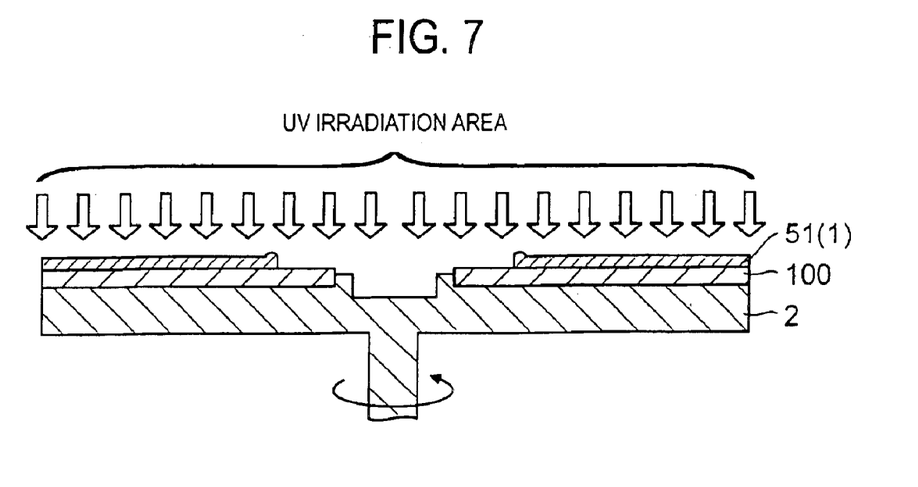
FIG. 7 is a cross-sectional view illustrating the process of forming the light-transmitting layer.

First, the plug means 3 is removed from the disk substrate 100 as shown in FIG. 6, and the disk substrate 100 is also removed from the rotating table 2. Next, the UV is irradiated with the disk substrate 100 placed on the rotating table 2 serving the curing stage as shown in FIG. 7 to thereby cure the resin layer 51 for completion of the light-transmitting layer 1. As shown in FIG. 7, the UV is irradiated in this full curing step to the area including at least the entire surface of the disk substrate 100.

In the full curing step, the UV may be irradiated either to the rotating disk substrate 100 or to the stationary disk substrate 100. For the uniform curing of the resin layer, however, the UV is preferably irradiated to the rotating disk substrate 100. The rotational speed in this step is preferably 50 rpm or more, and the rotational speed need not exceed 10% of the rotational speed used in the resin spreading. When this full curing step is included in the production process, the resin layer subjected to this step is not fully cured, and an excessively high rotational speed in this step may invite flowing of the resin in the outer peripheral region by the centrifugal force. In view of such situation, the rotational speed used in the full curing step preferably does not exceed the rotational speed used in the spreading of the resin.

As described above, the plug means 3 is quite useful in controlling the thickness distribution profile of the light-transmitting layer. Use of the plug means 3, however, is also associated with the advantage as described below. The disk substrate is formed with a center hole which is used in the mounting of the disk on the disk drive, and the resin can not be fed directly to the center of rotation (center of the disk substrate), and the resin is fed along an annular track at an equal distance from the rotation center. However, the outer peripheral region becomes more likely to become thickened with the increase in the distance of the feed point from the rotation center. In contrast, when the center hole of the disk substrate closed with a suitable plug means such as a plate member, disk member, plug or cap so that the resin can be supplied near the center of the plug means, that is, near the center of rotation, thickness variation of the light-transmitting layer in radial direction can be reduced. Such plug means is disclosed, for example, in JP-A 10-320850, 10-249264, 10-289489, 11-195250, and 11-195251.

The major advantages of the present invention will be realized without using the plug means. However, use of the plug means is preferable in view of the ease of controlling the thickness distribution profile of the light-transmitting layer. The plug means used in the present invention may be a member comprising at least the disk member which is capable of closing the center hole of the disk substrate, and typical plug means are those described in the publications as mentioned above. Use of a plug means 3 provided with the support shaft 32, however, is preferable in order to form the heap of the coating fluid 5 on the disk member 31 in the form of a cone with a relatively steep gradient as shown in FIG. 3B.

The plug means 3 provided with the support shaft 32 also enjoys the advantage of handling convenience of the plug means 3 since the plug means 3 can be grasped by the support shaft 32, and this facilitates removal of the plug means 3 after the spin coating. This in turn results in the reduced turbulence of the resin layer at the inner peripheral edge upon removal of the plug means from the disk substrate.

As previously discussed, JP-A 11-195251 describes a plug means of the structure having a circular cap and an integral support in the form of a hollow cylinder or a plurality of rods. The plug means illustrated in FIG. 1 has the following advantages over the plug means of this reference.

In JP-A 11-195251, the resin is dammed by the support wall or rods, which can cause thickness variations to the coating. In contrast, with the plug means illustrated in FIG. 1, the coating fluid is fed to the outer periphery of the support shaft, followed by spin coating. This sequence minimizes the thickness variation of the coating. Since the resin is applied to the outer periphery of the support shaft, washing of the plug means illustrated in FIG. 1 is easy as compared with the plug means of JP-A 11-195251. Since a coating fluid having a relatively high viscosity is fed to the interior of the hollow cylindrical support in JP-A 11-195251, the outer diameter of the support cannot be reduced below the limit necessary to maintain the coating fluid flowable. As a result, the coating start position is located relatively far from the center of rotation. As a consequence, when the coating thickness is not controlled according to the present invention, coating thickness would increase at a high degree in the outer peripheral region, and even if the present invention were applied, control of the thickness distribution would be considerably difficult. In contrast, the plug means illustrated in FIG. 1 allows the outer diameter of the support shaft to be significantly reduced, which also allows the coating start position to be located closer to the center of revolution.

Since the above-mentioned advantages are achievable with the plug means having a disk member and a support shaft, the remaining construction of the plug means is not critical. Although the plug means 3 is shown in FIG. 1 as having a frustoconical disk member 31 and a columnar support shaft 32, other plug means as illustrated in FIGS. 8A to 8D can also be used.

Figure 8A:
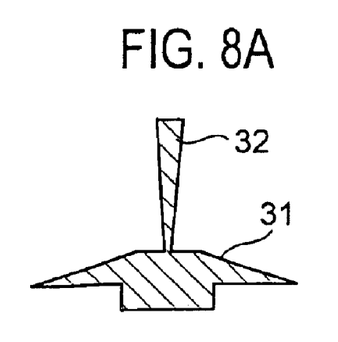
FIGS. 8A to 8D are cross-sectional views illustrating different examples of the plug means.

The plug means shown in FIG. 8A has a frustoconical disk member 31 and an elongated inverted frustoconical (or tapered) support shaft 32. This plug means allows the coating start position of the coating fluid to be located closer to the center of the disk member 31, namely, the coating start position to be located closer to the center of revolution. Unlike the support shaft 32 which is thin throughout its length, the tapered support shaft 32 invites only a limited decrease of mechanical strength. When the support shaft 32 is clamped by a chuck or the like, the tapered support shaft 32 is unlikely to come out of the chuck, which is advantageous upon detachment and transportation of the plug means. It is noted that the support shaft 32 need not be tapered throughout its length. The requirement is that at least a portion of the support shaft 32 has a frustoconical shape whose diameter gradually decreases toward the disk member 31, and the diameter of the support shaft does not increase in a region thereof located closer to the disk member than said portion.

Figure 8B:
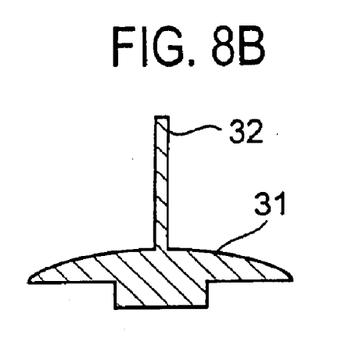
Figure 8C:
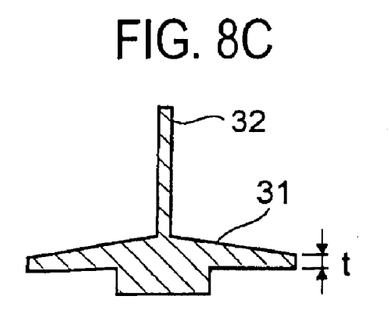
Figure 8D:
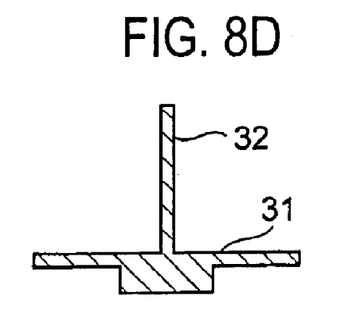

The plug means shown in FIG. 8B has a disk member 31 whose shape is different from FIG. 8A. In order that the coating fluid be uniformly spread over the disk member 31, it is preferred that the thickness of the disk member 31 gradually decreases toward the outer edge. To this end, the upper surface of the disk member 31 over which the coating fluid flows, as viewed in vertical cross section, may be straight as shown in FIG. 8A or curvilinear as shown in FIG. 8B. The outer edge of the disk member outer edge may also have a vertical face as shown in FIG. 8C. The outer edge of the disk member 31 should preferably have a thickness t of 0.4 mm or less. If the outer edge is too thick, the coating fluid may not be smoothly transferred from the disk member to the disk substrate, resulting in the resin layer being unevenly coated. In a further alternative, the disk member 31 may have a uniform thickness as shown in FIG. 8D.

In the plug means used herein, the support shaft 32 in proximity to the disk member 31 has a minimum diameter of preferably less than 4 mm, more preferably up to 2 mm. If the diameter of the support shaft 32 in proximity to the disk member 31 is too large, the coating start position is spaced apart from the center of the disk member 31, resulting in the resin layer 51 having a large thickness variation in a radial direction. However, if the diameter of the support shaft 32 in proximity to the disk member 31 is too small, the support shaft 32 becomes mechanically weak. For this reason, the minimum diameter of the support shaft 32 should preferably be at least 0.5 mm, more preferably at least 0.7 mm. The length of the support shaft 32 is not critical and may be determined as appropriate for ease of feed of the coating fluid to the outer periphery of the support shaft and ease of handling as by clamping. An appropriate length is about 5 to 100 mm, more preferably about 10 to 30 mm. If the support shaft 32 is too short, difficulty may arise at feeding the coating fluid to the outer periphery and clamping the shaft. Too long a support shaft 32 is cumbersome to handle.

The diameter of the disk member 31 should be larger than the diameter of the center hole 101 in the disk substrate and smaller than the inner diameter of the annular information recording area on the disk substrate. It is preferred that the diameter of the disk member 31 is at least 4 mm, especially at least 8 mm larger than the diameter of the center hole 101 because the coating fluid 5 can otherwise intrude below the disk member 31 to contaminate the side surface (inner side surface) of the disk substrate surrounding the center hole 101. Since detachment of the disk member 31 can often cause disturbances to the shape of the resin layer 51 located nearby, it is preferred that the diameter of the disk member 31 is at least 3 mm, especially at least 5 mm smaller than the inner diameter of the information recording area. Although the specific size of the disk member 31 depends on the diameter of the center hole and the inner diameter of the information recording area, the disk member 31 preferably has a diameter in the range of 20 to 40 mm, especially 25 to 38 mm, when the invention is applied to optical disks having a diameter of about 60 to 130 mm.

Any desired material may be used to construct the plug means. A choice may be made among metals, resins and ceramics as well as composite materials thereof. The disk member 31 and the support shaft 32 may be formed of the same material or different materials. Preferably, the plug means is constructed of metals by reasons of mechanical strength, durability and dimensional precision. Useful metals are stainless steel, aluminum and aluminum alloys.

The surface of the plug means 3, especially the entire surface of the disk member 31 should preferably have a lower surface tension than the coating fluid. If the surface of the plug means 3 is least wettable with the coating fluid, it becomes easy to wash coating fluid deposits away from the surface of the plug means. The surface tension can be controlled by selecting an appropriate material to construct the plug means. Alternatively and preferably, water and oil repellent treatment such as Teflon coating is carried out on the region where surface tension is to be reduced.

Next, various parts of the medium to which the present invention is applied are described in detail.

The supporting substrate 120 is provided to maintain rigidity for the medium. The supporting substrate 120 generally has a thickness of 0.2 to 1.2 mm, preferably 0.4 to 1.2 mm and may be either transparent or opaque. The supporting substrate 120 is usually constructed of a resin like conventional optical recording media although glass may also be used for the substrate. Grooves (guide grooves) 121 are generally formed in optical recording media, and such grooves are obtained by forming raised region in the supporting substrate 120 and transferring the raised configuration to the layers deposited thereon. The grooves 1G are regions located closer to the incident side of recording/reading laser beam, with regions interposed between the adjacent grooves serving as lands.

The light-transmitting layer 1 has a sufficient transparency for laser beam to pass therethrough. The light-transmitting layer preferably has a thickness in the range of 30 to 300 $\mu$m. The benefits of the invention become more outstanding when such a thin light-transmitting layer is provided. If the light-transmitting layer is thinner than the above-specified range, dust and debris depositing thereon can have detrimental optical effects. If the light-transmitting layer is too thick, it may be difficult to achieve a high recording density by an increase of NA.

As described above, the light-transmitting layer 1 may have a structure which is a laminate of the inner layer 1$i$ and the surface layer 1$s$. The inner layer 1$i$ may preferably exhibit less contraction upon curing as well as reduced birefringence. The surface layer 1$s$ may preferably exhibit high scratch resistance. The surface layer 1$s$ may preferably have a thickness of 0.1 to 10 $\mu$m, and more preferably 0.3 to 5 $\mu$m. When the surface layer is too thin, protective effect will be insufficient, and when the surface layer is too thick, it will be difficult to reduce the deflection and the birefringence of the light-transmitting layer.

As described above, a recess 11 and a minute bump 12 as shown in FIG. 11 are occasionally formed in the present invention, and such recess 11 and such minute bump 12 can be intentionally formed by controlling various conditions upon curing of the resin layer.

The distance $D_1$ measured in thickness direction of the light-transmitting layer 1 from the surface of the light-transmitting layer 1 to the bottom of the recess 11 is preferably in the range of 1 to 60 $\mu$m, when the position immediately before the sudden depression of the surface of the light-transmitting layer 1 near the outer peripheral edge is taken as reference for the surface level of the light-transmitting layer 1. It will be difficult for the minute bump 12 formed to function as the jumping hill in the formation of the surface layer if the distance $D_1$ were either too short or too long.

The height of the minute bump 12, namely, the distance $D_2$ measured in thickness direction of the light-transmitting layer 1 from the bottom of the recess 11 to the top of the minute bump 12 is preferably in the range of 3 to 50 $\mu$m, and more preferably, 5 to 40 $\mu$m. When the distance $D_2$ is too short, it will be difficult for the minute bump 12 formed to function as the jumping hill in the formation of the surface layer. When the distance $D_2$ is too long, the volume of the minute bump 12 will be large and it will be difficult to significantly reduce the deflection and the axial runout in the outer peripheral region of the medium.

When the light-transmitting layer is formed according to the present invention, both the distance $D_1$ and the distance $D_2$ can be easily nested within the preferable ranges as described above. When the medium is to be used in a system wherein the optical pickup is occasionally located near the outer peripheral edge of the medium, it is preferable that the distance $D_2$ is within the preferable range as described above, and also, that the relation: $D_1 \geq D_2$ is satisfied.

It is to be noted that a layer of functional film having the function of lubricity, water-repellency, oil-repellency, or the like may be provided on the light-transmitting layer.

EXAMPLE

Example 1

A read-only optical disk sample was fabricated as follows.

A disk-shaped supporting substrate having information-storing pits formed in its surface was molded from polycarbonate to an outer diameter of 120 mm, an inner diameter (center hole diameter) of 15 mm and a thickness of 1.2 mm. On the pit-formed surface of the substrate, a reflective layer of aluminum was deposited by sputtering.

Next, a UV curable resin (viscosity, 4500 centipoise at 25° C.) was fed onto the supporting substrate at a position 18 mm in radial distance from the center while the rotating table was rotated at 60 rpm. Then, the rotating table was rotated at 2000 rpm for 7.5 seconds whereby the resin was cast over the surface of the reflective layer to form a resin layer. A scraper 200 in the form of a thin plate was approached toward the outer side surface of the supporting substrate as shown in FIG. 4B at 6.5 seconds after the substantial completion of the resin spreading to thereby scrape the resin protruding from the outer side surface for 1 second. The scraper 200 was then moved away from the outer side surface of the supporting substrate, and simultaneously, deceleration of the rotation table was started. The UV was irradiated for 1.5 seconds from 0.3 second after the start of the deceleration. The time interval between the start of the deceleration and the termination of the rotation (deceleration time) was 2 seconds. UV Spot Cure BHG-250 manufactured by Mejiro Precision K.K. was used for the UV irradiation and the UV irradiation area was adjusted to an area with a diameter of 120 mm. The entire supporting substrate was irradiated with UV. Note that this UV irradiation means is a means wherein shape of the irradiation area can be adjusted as in the case of the Spot UV Curing Equipment as described above, and in the case of this irradiation means, energy density decreases in the irradiated plane from the center to the periphery.

Next, the resin layer was fully cured by irradiating the entire surface of the supporting substrate with UV without rotating the supporting substrate to thereby provide the light-transmitting layer. An optical disk sample was thereby obtained.

The steps from spin coating to curing were carried out in a clean room at 25° C. This also applies to the Examples and Comparative Examples as described below.

Example 2

An optical disk sample was prepared by repeating the procedure of Example 1 except that the plug means was used and the resin was spread by rotating the rotation table at 2000 rpm for 8 seconds. The plug means used was configured as shown in FIG. 1 and included a disk member 31 having a diameter of 38 mm and a support shaft 32 having a diameter of 1 mm and a length of 20 mm, both formed of stainless steel. The plug means and the surrounding area were excluded from the irradiated area by placing a mask having a diameter of 40 mm over the inner peripheral region of the supporting substrate. The plug means was removed from the supporting substrate after the irradiation, and the uncured area was cured by the UV irradiation without rotating the supporting substrate.

Example 3

An optical disk sample was prepared by repeating the procedure of Example 2 except that the resin was fed such that the resin heap formed on the disk member of the plug means would be in cone shape.

Example 4

An optical disk sample was prepared by repeating the procedure of Example 3 except that Spot UV Curing Equipment (250 W model) manufactured by Ushio Inc. was used for the UV irradiation and a lens adapted for an irradiation area of 12 mm×40 mm was mounted at the tip of the optical fiber unit, and that the equipment was adjusted so that an area on the disk at the radius of 20 to 60 mm could be irradiated with the UV.

Comparative Example 1

An optical disk sample was prepared by repeating the procedure of Example 1 except that the UV irradiation was conducted after the formation of the resin layer and after stopping the rotation of the supporting substrate by using the UV irradiation means as described below. It is to be noted that the scraping of the resin using the scraper 200 was not conducted in this Comparative Example.

The UV irradiation means used was UVH-0252C (4 kW) manufactured by Ushio Inc. to which a uniform auxiliary mirror had been mounted, and the UV irradiation means was adjusted such that the diameter of the UV irradiation area would be 200 mm and the UV would be irradiated beyond the outer peripheral edge of the supporting substrate. The uniform auxiliary mirror was mounted in order to realize uniform light intensity over the entire UV irradiation area through the diffused reflection of the beam.

Comparative Example 2

An optical disk sample was prepared by repeating the procedure of Comparative Example 1 except that a plug means was used which was the same as the one used in Example 2, and that the UV was irradiated after terminating the rotation of the supporting substrate and the plug means was subsequently removed.

Comparative Example 3

An optical disk sample was prepared by repeating the procedure of Example 3 except that the UV was irradiated after terminating the rotation of the supporting substrate and the plug means was subsequently removed. The means used for the UV irradiation, however, was the same as the one used in Comparative Example 1.

Comparative Example 4

An optical disk sample was prepared by repeating the procedure of Example 2 except that the UV was irradiated for 2 seconds while the rotational speed of the supporting substrate was kept at 2000 rpm after the spreading of the resin. The UV irradiation means used was the same as the one used in Comparative Example 1.

Comparative Example 5

An optical disk sample was prepared by repeating the procedure of Example 2 except that the UV was irradiated for 2 seconds after reducing the rotational speed of the supporting substrate to 1200 rpm after the spreading of the resin and while maintaining the rotational speed at that level, and the rotation was thereafter terminated. The UV irradiation means used was the same as the one used in Comparative Example 1.

Evaluation

The samples prepared in the Examples and the Comparative Examples were evaluated for their thickness of the light-transmitting layer in the area at a radial distance of 25 to 60 mm from the center. The results are shown in Table 1. It is to be noted that the information recording area was the area at a radial distance of 23 to 58 mm from the center.

The samples were also measured for deflection and axial runout using a mechanical precision measuring device, LM1200 manufactured by Ono Sokki K.K. The samples were measured at an interval of 5 mm in radial direction for the area at a radial distance of 23 to 58 mm from the center. The maximum values for the deflection and the axial runout are shown in Table 2 for each sample.

The samples prepared by using the present invention were evaluated for their distance $D_1$ and distance $D_2$ shown in FIG. 11 by using a surface contour measuring instrument, Surfcom 605A manufactured by Tokyo Seimitsu Co. $D_1$ was in the range of 30 to 50 $\mu$m while $D_2$ was in the range of 10 to 30 $\mu$m. It was also confirmed that $D_1$ was larger than $D_2$.

TABLE 1

Thickness of the light-transmitting layer (μm)

| Radius (mm) | Example 1 | Example 2 | Example 3 | Example 4 | Comp. Example 1 | Comp. Example 2 | Comp. Example 3 | Comp. Example 4 | Comp. Example 5 |
|---|---|---|---|---|---|---|---|---|---|
| 25 | 72 | 100 | 104 | 102 | 72 | 100 | 104 | 100 | 100 |
| 35 | 80 | 100 | 103 | 101 | 80 | 100 | 103 | 100 | 100 |
| 45 | 87 | 100 | 102 | 100 | 87 | 100 | 102 | 100 | 100 |
| 55 | 92 | 100 | 101 | 99 | 92 | 100 | 101 | 100 | 100 |
| 58 | 93 | 100 | 101 | 98 | 93 | 115 | 111 | 100 | 100 |
| 58.5 | 93 | 100 | 101 | 97 | 100 | 120 | 116 | 100 | 103 |
| 59 | 73 | 85 | 80 | 77 | 140 | 140 | 130 | 100 | 115 |
| 59.5 | 55 | 70 | 60 | 57 | 150 | 175 | 160 | 110 | 120 |
| 60 | 75 | 85 | 78 | 72 | 130 | 140 | 110 | 113 | 110 |

TABLE 2

| | Example 1 | Example 2 | Example 3 | Example 4 | Comp. Example 1 | Comp. Example 2 | Comp. Example 3 | Comp. Example 4 | Comp. Example 5 |
|---|---|---|---|---|---|---|---|---|---|
| Deflection (μm) | 76.3 | 93.8 | 96.7 | 95.1 | 88.6 | 100.7 | 121.9 | 98.2 | 108.5 |
| Axial runout (μm) | 60.8 | 80.6 | 82.3 | 78.5 | 120.4 | 143.8 | 133.7 | 88.6 | 103.7 |

The merit of the present invention is evident from the results of Table 1. To be more specific, comparison between Example 1 and Comparative Example 1 reveals that size of the bump in the outer peripheral region of the light-transmitting layer is markedly suppressed in Example 1. In Example 2 wherein the coating fluid was spread by using a plug means, the thickness of the light-transmitting layer was uniform on the information recording area. In Examples 3 and 4 where a heap of the resin in cone shape was formed on the disk member of the plug means, the light-transmitting layer was thinner in the outer peripheral region compared to the inner peripheral region. It should be noted that, in Comparative Example 4, the cured resin protruded beyond the outer peripheral edge of the sample in the form of resin icicles since the UV was irradiated while the medium was still rotating at a high speed.

The results of Table 2 also reveal that the axial runout has been markedly reduced in the present invention.

INDUSTRIAL APPLICABILITY

The present invention has enabled to reduce deflection and axial runout in the outer peripheral region of the optical information medium.

What is claimed is:

1. A method for preparing an optical information medium comprising a supporting substrate having a center hole, an information recording area provided thereon, and a light-transmitting layer including a resin layer formed on the information recording area through which recording/reading laser beam is transmitted, comprising:

feeding a coating fluid containing an actinic radiation-curable resin onto the supporting substrate;

rotating the supporting substrate so as to spread the coating fluid over the supporting substrate and form the resin layer; and irradiating the resin layer with actinic radiation to cure said re in layer while reducing a rotation speed of the supporting substrate.

2. The method according to claim 1, wherein energy density of said actinic radiation on the surface of said resin layer is lower in an outer peripheral region of said resin layer than in an inner region of said resin layer.

3. The method according to claim 1, wherein said irradiating is carried out such that an outer boundary of an area of the resin layer irradiated with said actinic radiation substantially matches with an outer peripheral edge of said supporting substrate.

4. The method according to claim 1, wherein said irradiating is carried out after scraping off at least some of the coating fluid that protrudes out of an outer peripheral edge of said supporting substrate.

5. An optical information medium comprising:
a supporting substrate having a center hole;
an information recording area provided on the supporting substrate; and
a light-transmitting layer formed on the information recording area through which recording/reading laser beam is transmitted, the light-transmitting layer including a recess at a position outside of the information recording area and a bump formed on the supporting substrate outside of the recess.

6. The optical information medium according to claim 5, wherein the relation:

$$D_1 \geq D_2$$

is satisfied when a distance in a thickness direction from a position on a surface of the light-transmitting layer inside of the recess to a bottom of the recess is designated as $D_1$, and a distance in a thickness direction from the bottom of the recess to a top of said bump is designated as $D_2$.

7. An optical information medium comprising:
a supporting substrate having a center hole;
an information recording area provided on the supporting substrate;
a light-transmitting layer formed on the information recording area through which recording/reading laser beam is transmitted, the light-transmitting layer including an actinic radiation-curable resin formed by spin coating, and having a thickness which does not increase from an inner peripheral region to an outer peripheral region at least in a region of the light transmitting layer on the information recording area, the light-transmitting layer having a thinned portion outside of said region and a thickened portion outside of the thinned portion.

8. The optical information medium according to claim 7, wherein the thickness of the light-transmitting layer is less at a position in the outer peripheral region compared to the thickness at least at a position in the inner peripheral region of the light-transmitting layer on the information recording area.

9. A method according to claim 1, wherein the substrate has a disk shape, and the information recording area and the light-transmitting layer are annular.

10. An optical information medium according to claim 5, wherein the substrate has a disk shape, the information recording area is annular, and the light-transmitting layer is annular and includes a resin.

11. An optical information medium according to claim 7, wherein the substrate has a disk shape, and the information recording area and the light-transmitting layer are annular.

12. An optical information medium according to claim 5, wherein the light transmitting layer has a thickness which does not increase from an inner peripheral region to an outer peripheral region at least in a region of the light transmitting layer on the information recording area.

* * * * *